United States Patent [19]

Ross et al.

[11] 4,153,537

[45] May 8, 1979

[54] CRYOTHERMAL MANIPULATION OF PETROLEUM

[76] Inventors: Sigmund L. Ross, 1280 E. 53rd St., Brooklyn, N.Y. 11234; Oscar Shuffman, deceased, late of Scarsdale, N.Y., by Rose Shuffman, executrix, 1 Cornell St., Scarsdale, N.Y. 10583

[21] Appl. No.: 918,586

[22] Filed: Jun. 23, 1978

Related U.S. Application Data

[62] Division of Ser. No. 762,657, Jan. 26, 1977, which is a division of Ser. No. 246,960, Apr. 24, 1972, Pat. No. 4,031,707.

[51] Int. Cl.² ............... C10G 31/08; C10G 31/06; C10G 33/00
[52] U.S. Cl. .............................................. 208/177
[58] Field of Search ............... 208/177, 187, 188, 289, 208/307

[56] References Cited

U.S. PATENT DOCUMENTS

| | | | |
|---|---|---|---|
| 2,778,205 | 1/1957 | Berger | 208/187 |
| 3,231,487 | 1/1966 | Nettles | 208/188 |

*Primary Examiner*—George Crasanakis
*Attorney, Agent, or Firm*—Richard K. Parsell

[57] ABSTRACT

Manipulating a body of crude petroleum to remove foreign matter present therein by introducing crude oil and water into a container and then introducing a mass of material which is at cryothermal temperature to cause freezing of the water and an increase in the surface tension of the petroleum crude. The cryothermal temperature corresponds to the freezing temperature of water and to lower temperatures. The method also provides for heating of the petroleum and frozen water in the container prior to the removal of the treated oil. The method aids in the expulsion of foreign matter from crude petroleum.

4 Claims, 10 Drawing Figures

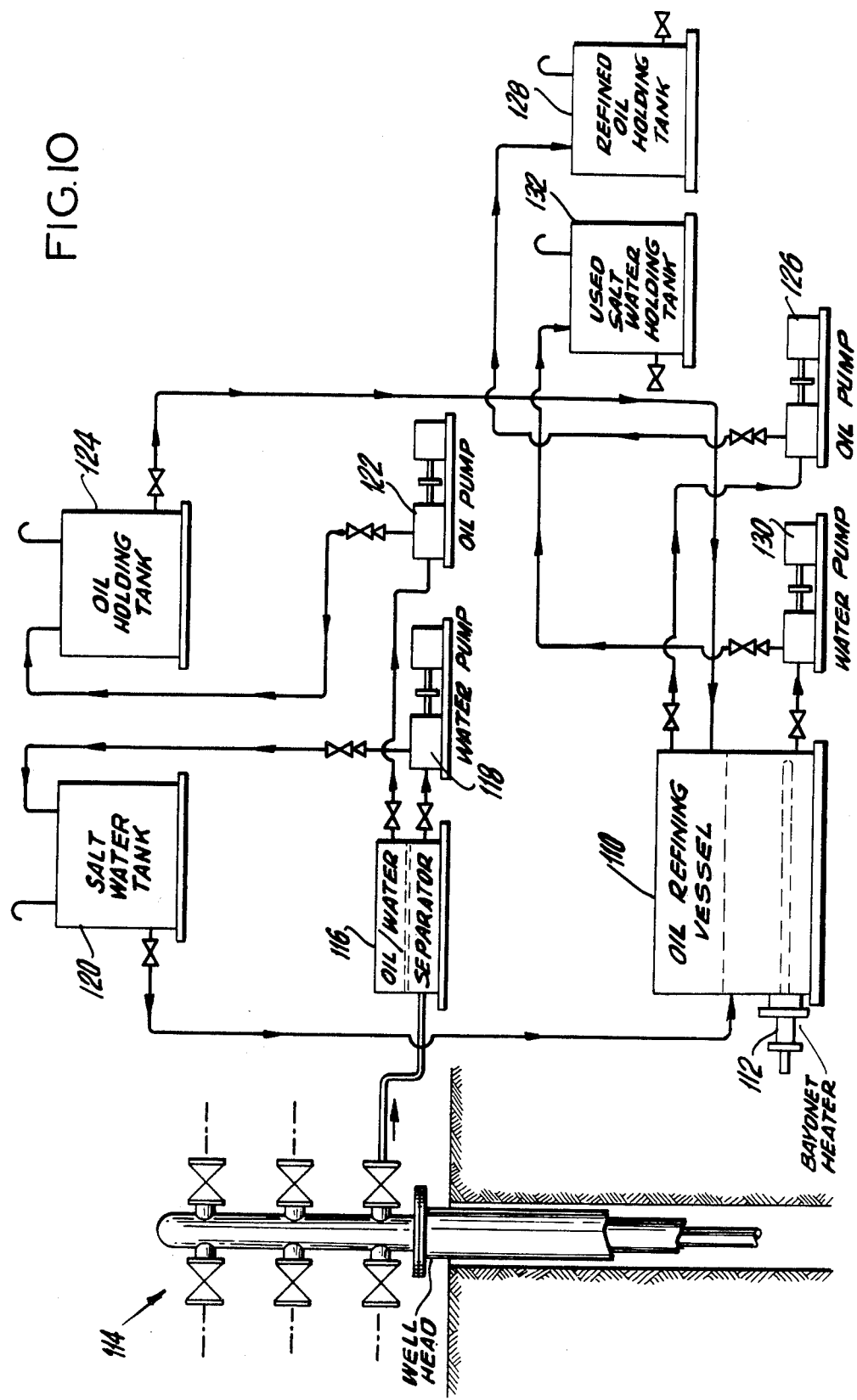

CRYOTHERMAL MANIPULATION OF PETROLEUM

This is a division of application Ser. No. 762,657 filed Jan. 26, 1977 which was a division of Ser. No. 246,960 filed Apr. 24, 1972, now U.S. Pat. No. 4,031,707.

The present invention relates to the reaction of petroleum to extreme cold, and more particularly the development of surface tension when a mass of petroleum is exposed to cryothermal temperatures. Cryothermal temperature refers to a temperature which corresponds to the freezing temperature of water at sea level, or below, whereby it may be at freezing, sub-freezing, or at cryogenics temperatures. As is well know, cryogenics temperatures are employed in the branch of physics known as cryogenics which relates to the production of and effects of very low temperatures on various substances.

In a mass of liquid or semi-liquid petroleum, whether it be refined, crude or used, there is an amorphous or random disposition of the molecules, intermixed with whatever chemicals, solids, liquids, and gases that are present in the petroleum mass. When surface tension is developed in the petroleum mass, there is called into being a more orderly arrangement or disposition of these molecules which, because of their electromagnetic effect, one to the other, produces a certain curvature to the surface of the petroleum mass. Permitting the surface tension to migrate into the mass, causes the petroleum to exhibit certain phenomena. This invention pertains to the contact or exposure of a petroleum mass to a freezing, sub-freezing or cryogenics temperature present in a transient atmospheric environment. Likewise, the invention is applicable to an arrangement wherein petroleum is subjected to a machine, apparatus or mechanism which exhibits freezing, sub-freezing or cryogenics temperatures. Because of the reaction of petroleum to cryogenics temperatures, the petroleum mass tends to move, and more particularly, to pull in or contract very rapidly. Specifically, the reaction of petroleum is to move very sharply and very quickly away from the lower temperature environment increasing in reaction as the temperature decreases, while at the same time increasing its surface tension. Because of the development of the surface tension and the very orderly arrangement of the molecules of the petroleum mass, as opposed to the amorphous disposition, the petroleum literally squeezes out any foreign matter from the petroleum mass, whether it be solid, liquid, or gas.

In general, the act of freezing liquids, including petroleum, causes a slowing down of the atomic motion of the molecules of the liquid. As the movement of the molecules is inhibited, they tend to come together under the influence of the electromagnetic field between the molecules. However, unlike other liquids, during the contraction of oil substances such as petroleum, there is a forcing out of the foreign matter disposed between the molecules. This same phenomena occurs in water, that is, the forcing out of entrained foreign matter in the liquid. When water freezes, the ice substance takes on the forms of tetrahedral crystals, with the electrical charges at each end of each tetrahydral. Thus, the end point of each tetrahedral crystal is attracted to the adjacent end of the adjacent tetrahydral crystal, thereby resulting in an orderly disposition of the molecules. The same arrangement and phenomena is achieved in oil. Once an orderly arrangement of molecules is achieved, there is only one or two angstroms of space between adjacent molecules. This extremely small space is primarily occupied by the electromagnetic force field between the molecules. Hence, there is little or no room for foreign matter in the resulting oil mass. The degree of elimination of foreign matter from the orderly arrangement of molecules of the petroleum mass which has been subjected to a cryogenics temperature, is predicated on the degree of abstraction of heat from the oil mass. The faster it freezes, the faster the foreign material is squeezed out of the petroleum mass. In order to completely remove the foreign matter, including the gases and chemicals that are entrained in the oil, the present invention employs a universal solvent, i.e. water. Water responds very well as a universal solvent, and also, in that the freezing of water forms ice crystals that have an electrical charge at each end of the tetrahedral, the charges will act as nucleation points, thereby aiding in the drawing of foreign matter entrained in the oil mass to the frozen water crystals.

When a petroleum mass is subjected to a cryothermal environment, surface tension occurs at the periphery of the mass which is first exposed to the cryothermal environment. The colder the cryothermal environment, the colder the oil becomes, and hence, the more any foreign matter present in the petroleum mass is dislodged and forced out. Surface tension of the petroleum mass indicates contraction of the petroleum mass, and the speed of contraction is a direct function of the temperature of the cryothermal substance. Thus, the lower the temperature the petroleum comes in contact with or is exposed to, the greater and faster the degree of contraction. This particular response of petroleum to freezing, sub-freezing and cryogenics temperatures permits petroleum to be directionalized, as more fully described hereinafter.

It should be noted that when reference is made to the word cryogenics, it is intended to refer to a substance such as liquid nitrogen which is a liquid and a temperature in the range of $-321°$ F. to $-345°$ F. On the other hand, as mentioned above, cryothermal is not cryogenics, but refers to the temperature of a substance which is at a temperature corresponding to freezing or sub-freezing of water or at cryogenics temperatures. Furthermore, it is to be noted that the field of cryogenics is presently being used in such applications as cryogenic surgery, cryogenic preservation of foods, such as fast freezing, and in addition, cryogenics is presently being used in the oil industry in an attempt to employ cryogenics to condense casing gases to form gasoline as the gases leave the oil well. The two major gases which are used in cryogenics in the liquified form are liquid oxygen and liquid nitrogen.

The subject technique for manipulating an oil mass such as petroleum may be employed in several applications. Fundamentally, the subject technique comprises the steps of providing a mass of material at a cryothermal temperature, followed by positioning said mass of cryothermal material into the vicinity of a petroleum mass so as to create surface tension in the petroleum and thereby enable the directionalization of the petroleum mass, or to increase the surface tension to a point whereby the petroleum mass is solidified.

The subject invention has particular application with respect to the problem of recovering oil that is inadvertantly spilled on a body of water such as the ocean, as for example when an oil well casing leaks or when the hull of an oil tanker is damaged and petroleum escapes. One of the known techniques used for removing oil spills and the like from oceans or large bodies of water is a technique known as chemical herding. One of the primary disadvantages of chemical herding is the possible infusion of chemicals in the surrounding flora or fauna, as well as the problem with respect to the amount of chemicals that are required for controlling an oil spill. In addition, the chemical herding technique is extremely costly, and the efficiency of the chemical herding system is greatly compromised in turbulent waters.

Another application of the subject technique is for the removal of oil from sandy beaches. At present, known techniques include the use of absorbing material such as straw, followed by removal of the top layer of sand. As is readily apparent, this is an extremely expensive procedure and very inefficient. It is also difficult to recover the oil.

Another problem associated with petroleum is in the transporting of petroleum by the use of large oil tankers. As is well known, tankers have developed large cracks which resulted in the seepage of oil into the ocean, and the creation of oil spills. No known technique has been developed for temporarily repairing a crack while the ship is at sea, and hence the only way of allieviating this condition is to pump all of the oil out of the compartment which has the crack.

A still further application of the subject invention is with respect to the problem associated with oil fires existing at the oil casing of a drilling rig. As is well known, the present techniques for stopping a fire which has developed at the well head is to employ high explosive materials so as to create a temporary environment around the well head so as to deprive the immediate vicinity of oxygen, thereby effecting an immediate cessation of the combustion of oil. As is well known, this is an extremely dangerous and hazardous technique.

A still further application of the subject technique is with respect to the refining of petroleum. At present, as petroleum leaves the well head, the oil and water are separated, after which the oil is sent to an oil holding tank, and subsequently shipped to the refinery for further processing. Usually no preliminary refining is attempted at the well head because of the generally costly equipment required.

A still further application in which the subject technique may be employed is with respect to the transporting of oil from extremely cold regions such as the Arctic. At present, it has been proposed to construct an oil pipe line across the State of Alaska, and along the entire length of this pipe, it will be necessary to heat the pipe line so as to ensure that the oil flows freely. As is readily apparent, this is an extremely costly and complicated system. An alternative would be to load the oil from the wells directly into large tankers, however, with this procedure it is necessary to ensure that the water lanes for the tankers are constantly open, even during winter.

Accordingly, it is the primary object of the subject invention to describe technique and apparatus for overcoming all of the shortcomings of the known techniques and apparatuses with respect to the specific applications described. More particularly, the subject invention provides a technique which is applicable to the herding of oil spills to enable the ready collection thereof; to removing oil spills on sandy beaches; to temporary repairing of ocean going oil tankers; to the control of oil from a well head to stop the flow of oil after an oil fire has developed; to the pre-refining of oil as it leaves a well head; and to an efficient and economical technique for transporting oil from a well head in the Artic to a refinery.

Fundamentally, the method of the subject invention for manipulating a petroleum mass comprises the steps of providing a mass of material at a cryothermal temperature, and positioning said mass of cryothermal material in the vicinity of the petroleum so as to increase the surface tension of the petroleum. The increase in surface tension of the petroleum causes a contraction of the petroleum mass, and a realignment of the molecules of the petroleum mass which results in the expulsion of foreign matter from the petroleum. The expulsion of the foreign matter effectively achieves a pre-refining of the petroleum mass. The development of surface tension also enables the movement of the mass of cryothermal material to control and directionalize the direction of movement of the petroleum mass so that the subject technique may be used for herding purposes. Furthermore, after sufficient exposure of the petroleum mass to the mass of cryothermal material, the petroleum mass will tend to solidify, whereby the subject technique may be used for solidifying petroleum flowing from a crack in an ocean going vessel so as to form a temporary plug to prevent the spillage of petroleum from a disabled vessel. The solidification of the petroleum may also be employed for solidifying the flow of petroleum leaving a well head so as to effectively provide a plug in the well head. The plug will deprive the petroleum in the well head from oxygen, and hence will be effective in putting out a fire at the well head site. In a situation where an oil spill has occurred on a sand beach, the mass of cryothermal material employed in the subject technique will cause freezing of the water in the sand, and the development of the surface tension of the petroleum mass, whereby the petroleum mass raises to a point above the level of the ice layer and the sand, whereby the petroleum may be readily skimmed or shoveled off the sandy beach.

The nature and substance of this invention, as well as its objects and advantages and the various embodiments thereof, including the apparatus thereof, will be more clearly recognized and fully understood by referring to the following detailed description and appended claims taken in connection with the accompanying drawings in which:

FIG. 10 is a flow diagram of a method of achieving pre-refining of gasoline according to the subject invention.

Before describing the several embodiments of the subject invention, it should be noted that the basic concept of the subject invention is a method of manipulating a body of crude, refined or used petroleum. This basic capability solves many problems which have heretofore been present with respect to the handling, transporting, or use of petroleum. The subject method comprises the steps of providing a mass of material at a cryothermal temperature corresponding to the freezing point of water at sea level. This temperature can be as low as a cryogenics temperature, and one of the most important aspects is that the mass of material at the cryothermal temperature is at a temperature lower than the ambient temperature of the body of petroleum at the initial point at which the subject method is commenced. The mass of material at cryothermal temperature is then next positioned adjacent the body of petroleum whereby the surface tension of the body of petroleum is immediately increased. The significant and marked increase in the surface tension of the body of petroleum enables the petroleum to be manipulated or controlled is such manner as to overcome problems previously associated with the handling and transporting of petroleum. As noted above, the increase in the surface tension of the body of petroleum also has the beneficial effect of causing the body of petroleum to undergo a pre-refining stage such that impurities, whether they be gases, liquids or solids, are expelled from the petroleum. Detailed below are only several of the many ways in which the subject method may be utilized in order to better enable man to transport, handle, or generally control one of his primary sources of energy, petroleum.

Figure 1:
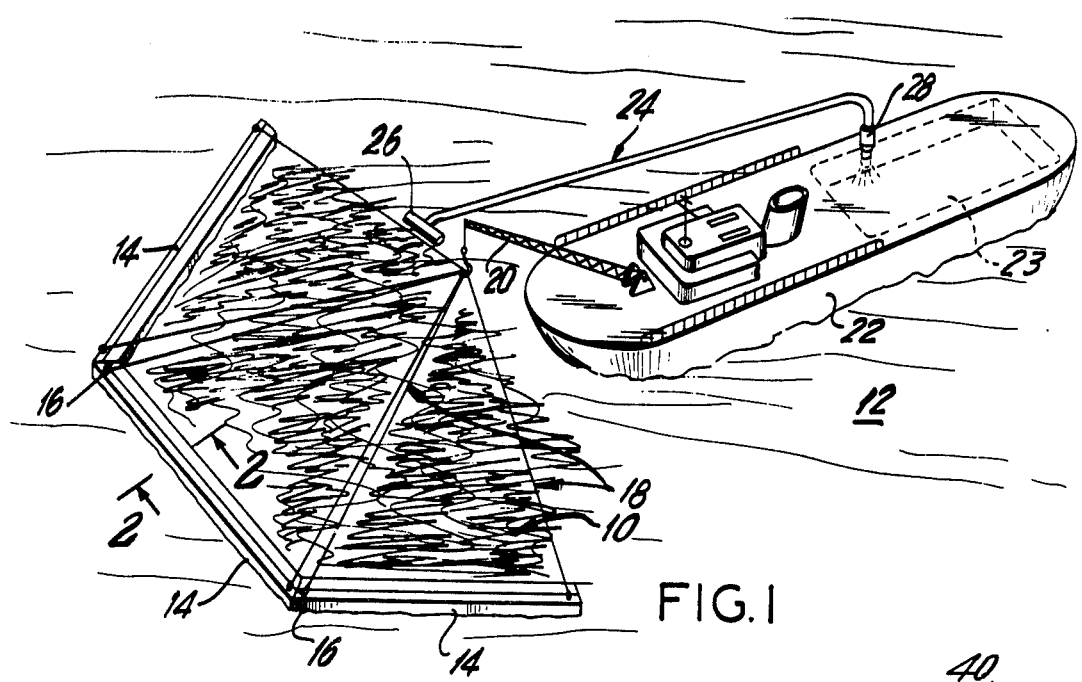
FIG. 1 illustrates a method and apparatus for achieving herding of an oil spill in accordance with the subject invention.
Figure 2:
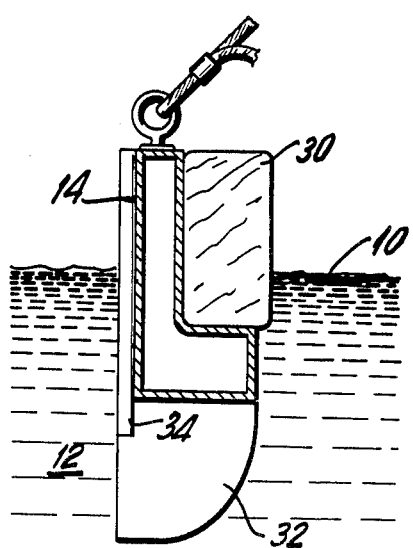
FIG. 2 is a cross-sectional view taken along line 2—2 in FIG. 1.

Referring now to FIGS. 1 and 2, the subject method may be employed for herding a body of petroleum which has inadvertently been spilled on a body of water. As is well known, oil spills have occurred because of damage to an oil tanker, or because of leaks which develop in off shore oil drilling assemblies. As illustrated in FIG. 1, the oil spill is designated by numeral 10 and is disposed in a relatively large area on a body of water 12. In order to confine, collect, and remove the body of petroleum 10 from the water, the subject invention may be utilized in conjunction with an apparatus comprising a plurality of booms 14, which are pivotally interconnected as at 16, and which are controlled by means of a system of guide wires 18 that are connected to a crane 20 of an oil collection vessel 22. Also included in the apparatus is a suction apparatus 24 having a suction head 26 for collecting the body of oil, and a nozzle 28 which leads to an oil collection compartment 23 of the vessel 22. Each boom 14 is of generally L-shaped in cross-section, and is made of suitable material for floatation purposes, and includes a plurality of pivoted keels 32 which are interconnected to the boom by means of shafts 34. Disposed in the L-shaped cut-out of each boom 14, and facing in the direction of the oil spill is a cryothermal material 30, such as dry ice. In order to herd an oil spill, the first step would be to position the booms in an arrangement to facilitate the collection of the oil spill, and with the cryothermal material 30 in place. The vessel 22 would be maneuvered in a manner such that the booms surround the periphery of the oil spill, and as the booms are positioned adjacent the oil spill, the dry ice immediately causes a lowering of the temperature of the adjacent water, and a simultaneous increase in the surface tension of the petroleum oil spill. The increase in surface tension of the oil spill greatly increases the ability to manipulate and directionalize the movement of the oil spill, and more particularly, to directionalize the oil spill in a direction to enable the suction apparatus 24 to efficiently suck up the oil spill for collection into the compartment 23 of vessel 22. It should be noted that the colder that water 12 becomes during the herding operation, its density increses, as does the density of the oil, and the accumlated densification of the oil and water results in a retardation of the wave action and cresting action of the water 12 which, of course, greatly aids in the herding and collection operation. This is to be contrasted with presently available chemical herding processes which are generally inefficient when the water is rough.

Another aspect of the subject invention is that in addition to the features of the technique as described above, there is a possibility of forming an almost instantaneous mass about the periphery of the petroleum mass 12, when the temperature differential between the cryothermal material and the water is significant. The formation of a peripheral solid mass about the oil spill 10 will further aid in confining the oil slick to a desired area for further manipulation and collection. The provision of the movable keels 32 greatly aids in controlling the direction of the booms, and preferably the keels should be aligned with the current action of the water to minimize the amount of movement of the booms during the collection operation. Although the preferred technique has been described with respect to the use of dry ice as the mass of cryothermal material, it is readily apparent that other materials may also be used. For example, instead of using blocks of dry ice, each of the booms 14 may be provided with expansion nozzles and tanks of gaseous carbon dioxide or liquid nitrogen, which may be sprayed along the periphery of the petroleum mass 10. As the liquid nitrogen or carbon dioxide gas is sprayed from the tank through the expansion nozzle, it loses heat, thereby forming a cryothermal solid which functions in the same manner as the dry ice, as described in the preferred embodiment.

Figure 3:
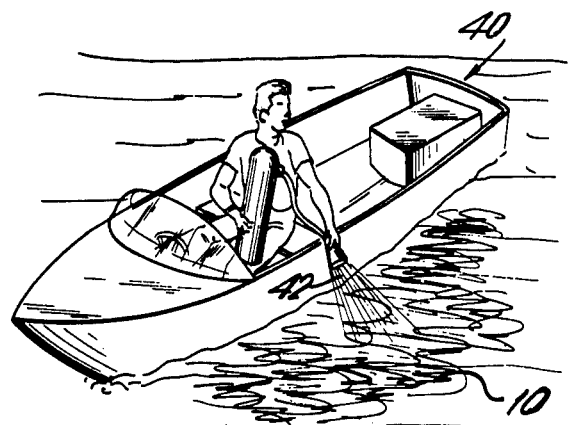
FIG. 3 illustrates an alternate embodiment of the subject technique for herding of an oil spill.

Reference is now made to FIG. 3, wherein an alternate embodiment is shown, in which cryothermal material 42 is sprayed onto the water about the periphery of an oil spill 10 by an operator in a small power boat 40. Once the mass of petroleum has been confined to a designated area, a collection vessel 22, equipped with a suction apparatus 24 would be provided for collecting the oil spill.

It is noted that in the several embodiments illustrated in FIGS. 1 throgh 3, no chemcials have been resorted to which could affect or unbalance the natural ecology of the body of water 12. This is in sharp contrast to the damage which might result to the fauna and Flora in a waterway if chemical herding techniques were employed.

Figure 5:
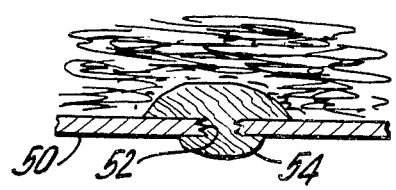
FIG. 5 is a view taken along line 5—5 in FIG. 4.
Figure 4:
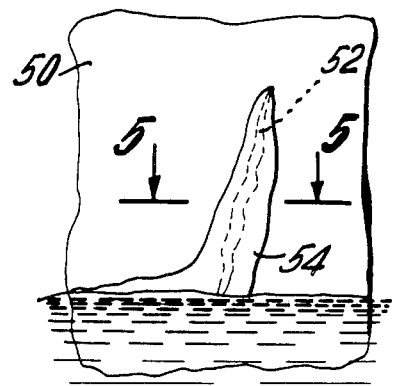
FIG. 4 is a detailed sectional view of a cracked hull of an oil tanker vessel in which the subject technique may be employed.
Figure 6:
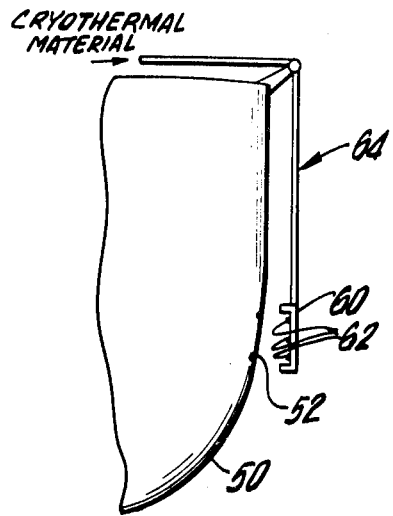
FIG. 6 is an apparatus for use with the subject invention in sealing a cracked hull in a vessel.

The subject invention may also be employed with reference to the problem of cracks that develop in the hulls of large oil tankers while on the high seas. Referring to FIG. 4, there is shown a portion of an oil tanker 50, which has developed a crack 52 in an oil compartment, whereby oil may readily seep through the crack 52 and result an oil spill. In order to temporarily seal the crack 52 to provide time for further action to be taken for preventing the development of a large oil spill, the subject invention may be employed. More particularly, a mass of material at a cryothermal temperature is provided adjacent the crack 52 so as to increase the surface tension of the oil seeping through the crack 52, and the mass of cryothermal material should be maintained for a period sufficient to cause the solidification of the oil seeping through the crack. As more clearly illustrated in FIG. 5, after sufficient exposure to the cryothermal material, the oil solidifies to effectively form a plug 54 thereby temporarily sealing crack 52. At such time, the oil in the damaged compartment may be removed, as for example by pumping it into a temporary resilient storage tank, after which the crack may be repaired by conventional techniques in order to enable the oil tanker to reach port for permanent repairs. FIG. 6 illustrates one form of apparatus for providing and positioning the mass of cryothermal material immediately adjacent a crack 52 in the hull 50. As schematically illustrated, the apparatus generally comprises a water tight head portion 60 including a plurality of nozzles 62, with the head portion connected via a hollow beam assembly 64 to a source of cryothermal material (not shown) such as liquid nitogen or liquid carbon dioxide. The apparatus is lowered such that the head is opposite the crack 52, after which cryothermal material is introduced through the beam assembly 64 and out the nozzles 62 for impingment around the area surrounding the crack 52. As noted above, the cryothermal material effectively increases the surface tension of the petroleum seeping through the crack 52, and eventually causes the solidification of the seeping petroleum so as to effectively form a plug 54 for temporarily sealing the crack.

Figure 7:
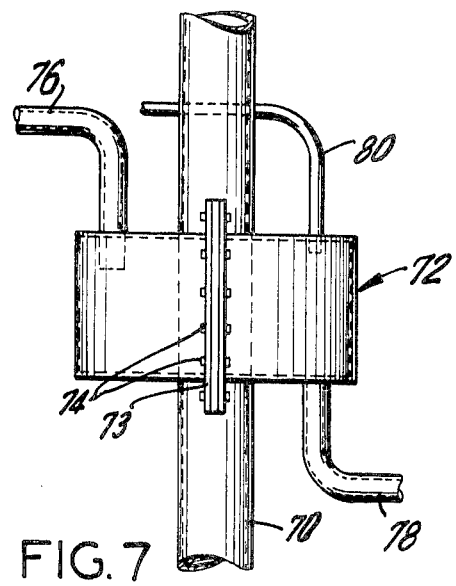
FIG. 7 is a side view of an apparatus for use in conjunction with a well casting.
Figure 8:
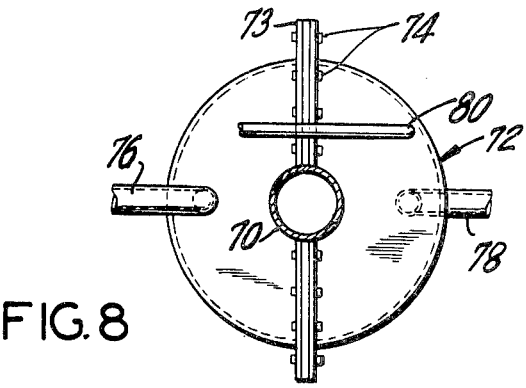
FIG. 8 is a plan view of the apparatus of FIG. 7.

Another application of the technique of the subject invention is to control oil fires at sea on oil drilling platforms. Fundamentally, the subject technique of putting out oil fires provides for the placing of a refrigeration collar around the oil casing. A cryothermal material, preferably liquid nitrogen, is pumped into the collar whereby the casing is chilled, and correspondingly, the oil flow through the collar is simultaneously chilled. As the oil flow is chilled, the surface tension thereof is increased until a zero pour condition of the oil is attained in the vicinity of the collar. More particularly, the oil forms a plug thereby preventing further oil from being conducted through the casing. The stopping of the oil flow cuts off the supply of oxygen to the oil, thereby quickly extinguishing the fire fed by oil in the casing. If water is a part of the substance being conducted through the casing, ice will rapidly form and facilitate the development of the plug in the flow. An example of the type of collar which may be employed in the subject invention is illustrated in FIGS. 7 and 8. More particularly, a casing pipe 70 which extends to an underground deposit of oil (not shown) has mounted thereon a hollow, annular collar 72 made of two sections, each including flanges 73 that are bolted together as at 74. The annular enclosure defined by the collar 72 is provided with a cryothermal material supply line 76, and a cryothermal material return line 78. In addition, a vent line 80 is in communication with the interior of the collar 72. Suitable insulation is provided on the annular collar 72, the supply line 76, and the return line 78. In operation, when it is desired to stop the flow of oil through the casing 70, cryothermal material is supplied to the collar 70 via the supply line 76, circulates within the annular collar 72, and is exhausted through the return line 78. It is noted that when the apparatus illustrated in FIG. 7 and 8 is used on an offshore drilling site, the annular collar 72 should be placed as close to the water line as possible. The reason for this is that since oil does not expand, it is preferable to slow down and form a plug in the flow of oil in the casing 70 at the water level, since the movement of the ocean stream in the vicinity of the collar will draw off heat, and accordingly this will faciliate the formation of a plug in the oil casing line 70. Control of the collar and the flow of cryothermal material therethrough is preferably controlled by suitable electrically actuated or mechanically actuated valves (not shown).

Still a further application of the subject invention is with respect to the control of pollution caused by oil on sandy beaches. Using the subject invention, an oil slick on a beach would be sprayed with a cryothermal material, preferably carbon dioxide or liquid nitrogen, so as to freeze the water at or just below the surface of the sand. Since, on freezing, ice will expand to a maximum of 9% of volume, the expanding ice will lift the hardened oil slick up off the beach surface. Also, any oil which has seeped into the interstices off the sand will be squeezed out. The resulting arrangement will be a layer ice. Hence, using conventional scraping or shoveling techniques, the oil may be readily removed, with the required of ice. Hence, using conventional scraping or shoveling techniques, the oil may be readily removed, with the required removal of sand being much less than presently obtained using conventional techniques.

The subject invention may also be employed for the cryothermal manipulation of petroleum in artic and sub-artic regions to permit certain atypical handling of oil crudes. Transportation of oil in the artic can be achieved by tractor-train rather than by the use of a heated pipe line. Using the subject method of providing a cryothermal material, and positioning it adjacent an oil mass, the oil may be solidified to a solid mass. After freezing, the ambient temperature of the artic region will retard thawing, whereby the solid mass of oil crudes may be linked together and transported in a tractor-train arrangement across a significant portion of the artic area.

Figure 9:
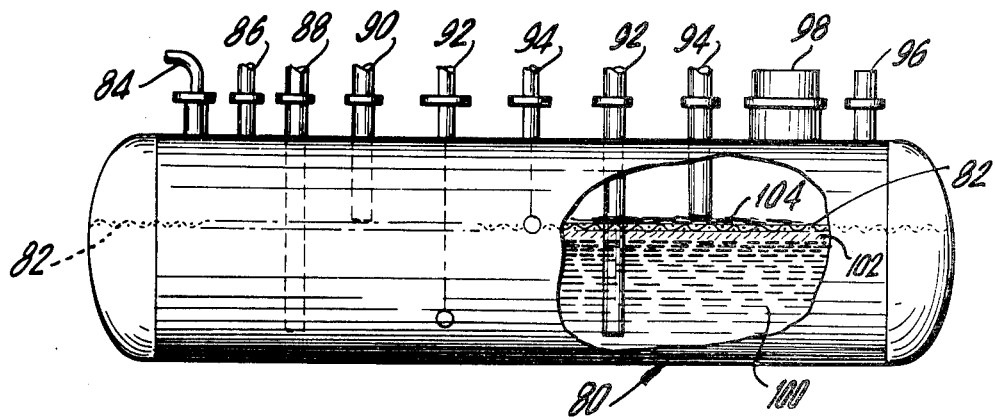
FIG. 9 is a partial sectional view of an apparatus for achieving pre-refining of petroleum according to the subject invention.

As noted above, increased surface tension of a petroleum mass displaces entrained foreign matter, be it liquid, solid or gas. The reaction of petroleum to freezing, sub-freezing and cryogenics temperatures accordingly permits preliminary refining both of crude and used oil. Furthermore, when oil is confined within a container, the interior surfaces of the container provide exposed surfaces for transmitting cold temperatures to the confined oil, thereby increasing the surface tension of the confined oil. As the temperature of the oil is lowered, more of the entrained foreign matter and chemicals are displaced or squeezed out. Referring now to FIG. 9, a cylindrical container 80 is closed at its opposite end and includes a generally horizontal planar screen 82 disposed therein. A vent 84 is provided in the upper portion of the container 80, as well as a cryothermal material inlet pipe 86, a water inlet pipe 88, and a crude oil inlet pipe 90. Two water outlet pipes 92, 92 are also provided, as well as two oil outlet pipes 94, 94. A manhole 98 is provided, as well as a cryothermal outlet pipe 96. In operation, when the apparatus illustrated in FIG. 9 is used in a "batch process" according to the subject invention, cryothermal material, water, and crude oil are input to the cylindrical container 80. The cryothermal material causes a marked increase in the surface tension of the crude oil, whereby it expells foreign matter, whether it be liquid, gas or solids. The cryothermal material also causes a freezing of the water, generally in the vicinity of the screen 82, whereby the resulting products within the cylindrical container are, in order, a body of water, a layer of ice in the vicinity of screen 82, and the pre-refined crude oil disposed above the layer of ice. It is noted that the provision of the water within the container 80 is particularly advantageous with respect to achieving the pre-refining of the crude oil in that water, being a universal solvent, will aid in the removal of the foreign matter from the oil as the surface tension thereof is increased by the cryothermal material. Upon completion of the pre-refining operation, the materials within the cylindrical container 80 are allowed to thaw, and if desired, heating means may be provided to facilitate the thawing, after which the water and the pre-refined oil are removed respectively via the outlets 92 and 94. In addition, the cryothermal material is removed via the pipe 96. Since pressure is not required throughout the process for pre-refining oil, the container 80 may be in the form of an open tank and an arrangement could be made with the various materials, including the water, the crude oil, and the cryothermal material, being pumped into the container in a continuous manner, and the pre-refining process being conducted in a continuous operation. Preferably, the ratio of oil to water is 60% water to 40% oil.

Reference is now made to FIG. 10, which illustrates a flow diagram of a continuous process according to the subject invention for pre-refining oil as it leaves a well head at a drilling site. A processing container of a type shown in FIG. 9 is designated by numeral 110 in FIG. 10, with the addition of a bayonet heater, designated by numeral 112. The fluid leaving well head 114 is provided to an oil water separator 116, after which the water passes through pump 118 and is deposited in salt water tank 120. The oil from oil water separator 116 is conveyed to oil pum 122 and thence to oil holding tank 124. Salt water from holding tank 120 is then conveyed to the oil refining vessel 110, along with oil from the oil holding tank 124. The pre-refined oil from oil refining vessel 110 is conveyed through pump 126 to an refined oil tank 128, while the water is conveyed via the water pump 130 to the used salt water holding tank 132. From the refined oil holding tank 128, the oil is convey via conventional means to an oil refinery for further processing. It should be noted that, as a general rule, the fluid substances leaving the well head 114 generally comprises two-thirds salt water and one-third crude oil.

The present invention has been described in detail above for the purposes of illustration only and is not intended to be limited by this description or otherwise except as defined in the appended claims.

What is claimed is:

1. A method for pre-refining a body of crude petroleum comprising the steps of:

introducing crude petroleum and water into a container;

introducing in said container a mass of material which is at a cryothermal temperature corresponding to the freezing point of water at sea level or lower, the cryothermal temperature of said material is lower than the temperature of said petroleum and water so as to cause freezing of said water and an increase in the surface tension of said crude petroleum thereby resulting in the expulsion of foreign matter from said petroleum to said water to produce pre-refined petroleum; and removing the pre-refined petroleum from the container.

2. A method for pre-refining a body of crude petroleum as set forth in claim 1 wherein said steps are performed in a continous manner.

3. A method for pre-refining a body of crude petroleum as set forth in claim 1 further including the step of heating said petroleum and frozen water within the container prior to the step of removing the pre-refined petroleum therefrom.

4. A method for pre-refining a body of crude petroleum as set forth in claim 1 wherein the proportion of water to crude petroleum introduced to the container is approximately 2 to 1.

* * * * *